United States Patent
Daniel et al.

(10) Patent No.: US 11,954,195 B2
(45) Date of Patent: Apr. 9, 2024

(54) MULTI-LEVEL AUTHENTICATION FOR SHARED DEVICE

(71) Applicant: FTS FOREST TECHNOLOGY SYSTEMS LTD., Victoria (CA)

(72) Inventors: Sean Daniel, Victoria (CA); Bradley William Zarikoff, Victoria (CA); Craig William Welburn, Victoria (CA); Joel Frederic Fieber Rose, Cowichan Station (CA); Gabriel Rechwan, Victoria (CA)

(73) Assignee: FTS FOREST TECHNOLOGY SYSTEMS LTD. (CA)

( * ) Notice: Subject to any disclaimer, the term of this patent is extended or adjusted under 35 U.S.C. 154(b) by 0 days.

(21) Appl. No.: 17/290,729

(22) PCT Filed: Nov. 1, 2018

(86) PCT No.: PCT/CA2018/000211
§ 371 (c)(1),
(2) Date: Apr. 30, 2021

(87) PCT Pub. No.: WO2020/087149
PCT Pub. Date: May 7, 2020

(65) Prior Publication Data
US 2022/0004614 A1    Jan. 6, 2022

(51) Int. Cl.
*G06F 21/35*    (2013.01)
*G06F 21/40*    (2013.01)

(52) U.S. Cl.
CPC .............. *G06F 21/35* (2013.01); *G06F 21/40* (2013.01)

(58) Field of Classification Search
None
See application file for complete search history.

(56) References Cited

U.S. PATENT DOCUMENTS

| | | | |
|---|---|---|---|
| 7,386,726 B2 | 6/2008 | Gehrmann | |
| 8,806,205 B2 * | 8/2014 | Metke | H04L 63/0815 713/168 |

(Continued)

OTHER PUBLICATIONS

WIPO International Preliminary Report on Patentability for PCTCA2018000211, dated Mar. 1, 2021, 3 pages.

(Continued)

*Primary Examiner* — Trang T Doan
(74) *Attorney, Agent, or Firm* — Baumgartner Patent Law; Marc Baumgartner

(57) ABSTRACT

A computer system is provided for protecting access to one or more hardware devices with a hardware device password that is invisible to a user, the system comprising a mobile device and the hardware device, the mobile device including: a memory, the memory storing one or more invisible passwords; an application in the memory; a wireless interface for communicating with the hardware device; and a processor coupled to the memory, the application and the wireless interface, the hardware device including: a memory; a wireless interface for communicating with the mobile device; and a processor coupled to the memory and the wireless interface; wherein the processor in the mobile device is configured to receive a hardware device identifier from the processor in the hardware device; wherein the application in the mobile device is configured to select, based upon the hardware device identifier, the invisible password for the hardware device; and the processor in the hardware device is configured to authenticate the application upon receipt of the invisible password.

12 Claims, 7 Drawing Sheets

(56) References Cited

U.S. PATENT DOCUMENTS

| | | |
|---|---|---|
| 8,850,533 B2 | 9/2014 | McLaren |
| 9,270,471 B2 | 2/2016 | Xie |
| 2011/0092185 A1* | 4/2011 | Garskof ............... H04L 63/083 |
| | | 455/411 |
| 2014/0281539 A1 | 9/2014 | Faltyn |
| 2015/0242609 A1* | 8/2015 | Zheng ................... G06F 21/34 |
| | | 713/159 |
| 2016/0092670 A1 | 3/2016 | Moseley |
| 2016/0212129 A1 | 7/2016 | Johnston |
| 2016/0378968 A1 | 12/2016 | Baca |
| 2017/0034156 A1* | 2/2017 | Ekambaram .......... H04W 12/06 |
| 2017/0070494 A1 | 3/2017 | Childress |
| 2019/0056132 A1* | 2/2019 | Warren ................... F24F 11/62 |
| 2019/0098113 A1* | 3/2019 | Park ....................... H04L 67/60 |

OTHER PUBLICATIONS

WIPO International Search Report for PCTCA2018000211, dated Jun. 15, 2019, 3 pages.

WIPO Written Opinion of the International Searching Authority for PCTCA2018000211, dated Jun. 15, 2019, 3 pages.

* cited by examiner

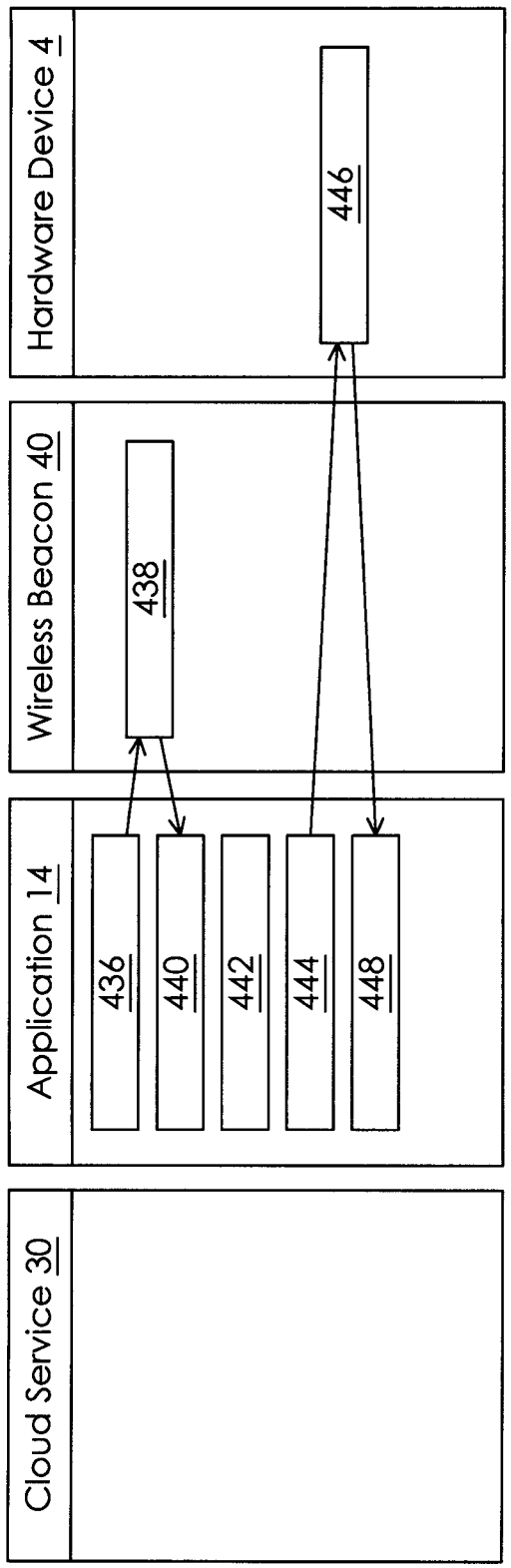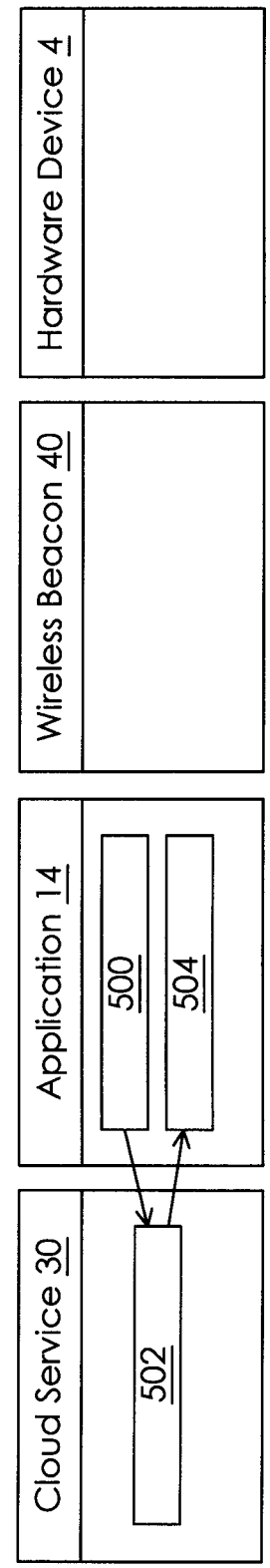
FIG. 8
FIG. 9

MULTI-LEVEL AUTHENTICATION FOR SHARED DEVICE

CROSS-REFERENCE TO RELATED APPLICATIONS

The present invention is filed under 35 U.S.C. § 371 as the U.S. national phase of International Application No. PCT/CA2018/000211, filed Nov. 1, 2018, which designated the United States and which is hereby incorporated in its entirety, including all tables, figures, and claims.

FIELD

The present technology is a system and method for controlling access to data transmitting equipment. More specifically, it is an application (app) that manages passwords for shared hardware devices and replicates the passwords to user devices while obscuring the password from the user.

BACKGROUND

In the past, protecting data in a hardware device relied upon a physical lock on the device. Data sets were retrieved by a technician unlocking the device and removing the data. This is not practical when devices accept wireless connections. In more recent times, the data are transmitted wirelessly. While this removes the need for a technician physically access the device, it creates security issues. Similar security issues occur with mobile devices. In these, passwords and password authentication are used to secure the data. However, if an employee lost their mobile device, an unauthorized party could retrieve any unsecured data on the phone and potentially access services within the company. As another example, if the employee leaves the company and does not give back the mobile device, the former employee could still potentially access sensitive data stored on the device or within the company.

United States Patent Application 20170070494 discloses a method, computer program product and computer system for password management. The embodiment may include a computing device that creates a password inventory. The password inventory may be a list of one or more passwords, where each of the one or more passwords corresponds to a password key. The embodiment may update the password inventory without input from a user. The embodiment may receive a first login request from a first device. The embodiment may transmit information detailing a first password key to the first device, where the first password key corresponds to a first password from the list of one or more passwords. The embodiment may receive information detailing a first entered password from the first device. The embodiment may determine whether the first entered password is identical to the first password from the list of one or more passwords. This technology would not protect a device password and therefore would not protect the data once a user obtained the device password.

United States Patent Application 20170034156 discloses that a mobile device can receive, from an application installed on a wearable device, an authentication query. Based upon the authentication query, an application installed on the mobile device can be determined to have been authenticated. In response to determining that the application installed on the mobile device has been authenticated, a temporary password can be generated at the mobile device and converted into a vibration pattern. The vibration pattern can be vibrated at the mobile device. The temporary password can be transmitted from the mobile device to the wearable device for use in authenticating the application installed on the wearable device. This technology would require managing a large number of authentication queries as each wearable device would have their own authentication query resulting in a separate temporary password for each wearable device. Further, if a user is no longer to be allowed access, the authentication query on each device would have to be changed such that the app on the mobile device is no longer authenticated. Hence, it is a cumbersome approach to protecting access to a device and is not scalable.

United States Patent Application 20160378968 discloses technologies for depth-based user authentication include a mobile computing device to display a login image including a depth channel on a display of the mobile computing device. The mobile computing device determines a selection of a plurality of objects of the login image made by a user of the mobile computing device, generates a user-selected password based on a relative depth of each object of the plurality of objects selected by the user, and permits access to the mobile computing device in response to a determination that the user-selected password matches a device login password. This technology would not protect a device password and therefore would not protect the data once a user obtained the device password.

United States Patent Application 20160212129 discloses a method of accessing data at a device, wherein the data is stored remotely from the device or in removable storage, comprises the following steps: (i) sending a request from the device to access the data, the request including an identification code of a secure element or memory card associated with the device; (ii) verifying, based at least partly on the identification code, whether access to the data is to be allowed or denied; and (iii) allowing or denying the device access to the data accordingly. This technology would not protect a device password and therefore would not protect the data once a user obtained the device password.

United States Patent Application 20140281539 discloses systems and methods for a secure mobile framework to securely connect applications running on mobile devices to services within an enterprise. Various embodiments provide mechanisms of securitizing data and communication between mobile devices and end point services accessed from a gateway of responsible authorization, authentication, anomaly detection, fraud detection, and policy management. Some embodiments provide for the integration of server and client-side security mechanisms, and for the binding of a user/application/device to an endpoint service along with multiple encryption mechanisms. For example, the secure mobile framework provides a secure container on the mobile device, secure files, a virtual file system partition, a multiple level authentication approach (e.g., to access a secure container on the mobile device and to access enterprise services), and a server side fraud detection system. In some embodiments, the multiple level authentication approach can include an operating system integrity check as part of the secure mobile framework. This technology provides secure access to storage. It would not protect a device password and therefore would not protect the data once a user obtained the device password.

United States Patent Application 20160092670 discloses a process of authenticating a person into a computer system as an authorized user by comparing the person's answers to questions that were defined by the authorized user during computer system account creation. The process is analogous to a property security system in that they both use concepts of Gate, Door, Safe, Frisk, and Key. Gate question prevents imposters from entering the computer system. Door question prevents imposters from viewing data should they get past the Gate. Safe question prevents imposters from updating data and viewing confidential data should they get past the Door. Frisk question catches imposters should they enter the computer system by guessing the correct answers to the authorized user's Key, Gate, Door or Safe questions. Key question mitigates imposter brute force attacks by silently locking and unlocking the authorized user account during Gate, Door, Safe, and Frisk questions when the authorized user answers with the Key question instead. This technology again would not protect the data once the questions and answers were known to the user, and hence would not protect the device from unauthorized access.

U.S. Pat. No. 8,850,533 discloses techniques for multi-level authentication for medical data access. A system may include a central medical information management system that provides restricted access to medical data. An accessing device supports multiple different authentication levels. For example, the accessing device may use a combination of device identifiers, passwords, and quick access codes to ensure access only by authorized users. This technology again would not protect the data once the questions and answers were known to the user, and hence would not protect the device from unauthorized access.

What is needed is a system that can securely protect access to one or more devices with multi-level authentication, using a single, randomly generated password for the devices that remains invisible to the user. It would be preferable if communication was wireless. The system would preferably include an app on a mobile computing device, accessible with the user's username and password. The system would still preferably include multiple hardware devices located in a range of locations, including remote locations. The system would still further preferably include cloud storage. Such as system would be scalable to a large number of hardware devices.

SUMMARY

The present technology is an app that is security system that allows for hardware to be protected with a unique, randomly generated password that remains unseen by a user. The user gains access to the hardware indirectly, because of the multi-level protection. The user has their own user password, which allows access to the hardware password via the app, which then allows access to the hardware. The user never sees the hardware password, nor can they change the hardware password. In this manner, access to the hardware is protected. An additional advantage is that a user can gain access without ever having to remember the hardware device password as it is known to the system, but unknown to the user.

In one embodiment, a computer system for protecting access to one or more hardware devices with a hardware device password that is invisible to a user is provided, the system comprising a mobile device and the hardware device, the mobile device including: a memory, the memory storing one or more invisible passwords; an application in the memory; a wireless interface for communicating with the hardware device; and a processor coupled to the memory, the application and the wireless interface, the hardware device including: a memory; a wireless interface for communicating with the mobile device; and a processor coupled to the memory and the wireless interface; wherein the processor in the mobile device is configured to receive a unique hardware device identifier from the processor in the hardware device; wherein the application in the mobile device is configured to select, based upon the unique hardware device identifier, the invisible password for the hardware device; and the processor in the hardware device is configured to authenticate the application upon receipt of the invisible password.

The computing system may further comprise a remote computing storage, the remote computing storage for storing the one or more invisible passwords and the hardware device identifier and communicating with the application.

In the computing system, the remote computing storage may be cloud storage.

The computing system may further comprise at least one additional mobile device, the mobile devices each including a memory; an application in the memory, wherein the application is the same application as on the mobile device; a wireless interface for communicating with the hardware device and the remote computing storage; and a processor coupled to the wireless interface and the memory, the cloud storage configured to provide the invisible password to the additional mobile devices.

In another embodiment, a method for protecting wireless access to a hardware device with a hardware device password that is invisible to a user is provided, the method comprising wirelessly receiving, at a mobile device, a unique hardware identifier transmitted from a hardware device, matching, at the mobile device, the hardware identifier with the same hardware identifier stored on the mobile device, selecting, at the mobile device, an invisible password based on the hardware device identifier, wirelessly transmitting the invisible password from the mobile device to the hardware device, and authenticating an application on the mobile device at the hardware device upon receipt of the invisible password.

The method may further comprise wirelessly sending the invisible password and the hardware identifier from the mobile device to a remote storage device.

The method may further comprise the remote storage device wirelessly sending the invisible password and the hardware identifier to one or more other mobile devices and the one or more mobile devices storing the invisible password and the hardware identifier.

The method may further comprise the one or more other mobile devices receiving the hardware identifier transmitted from the hardware device, matching, at the one or more mobile devices, the hardware identifier with the same hardware identifier stored on the mobile device, selecting, at the one or more mobile devices, the invisible password based on the hardware device identifier, wirelessly transmitting the invisible password from the one or more mobile devices to the hardware device, and authenticating an application on each of the one or more the mobile devices at the hardware device upon receipt of the invisible password.

The method may further comprise a plurality of hardware devices each transmitting a unique hardware identifier to one or more mobile devices.

The method may further comprise providing one or more mobile devices with a token to permit access to the application.

The method may further comprise revoking the token, thereby preventing access.

In another embodiment, a method for communicating data between a hardware device and a mobile device is provided, the method comprising wirelessly receiving, at a mobile device, a unique hardware identifier transmitted from a hardware device, matching, at the mobile device, the hardware identifier with the same hardware identifier stored on the mobile device, selecting, at the mobile device, an invisible password based on the hardware device identifier, transmitting the invisible password from the mobile device to the hardware device, authenticating an application on the mobile device at the hardware device upon receipt of the invisible password and communicating data between the one or more hardware devices and the mobile device.

The method may further comprise wirelessly sending the invisible password and the hardware identifier from the mobile device to a remote storage device.

The method may further comprise the remote storage device wirelessly sending the invisible password and the hardware identifier to one or more other mobile devices and the one or more mobile devices storing the invisible password and the hardware identifier.

The method may further comprise the one or more other mobile devices receiving the hardware identifier transmitted from the hardware device, matching, at the one or more mobile devices, the hardware identifier with the same hardware identifier stored on the mobile device, selecting, at the one or more mobile devices, the invisible password based on the hardware device identifier, wirelessly transmitting the invisible password from the one or more mobile devices to the hardware device, and authenticating an application on each of the one or more the mobile devices at the hardware device upon receipt of the invisible password.

The method may further comprise a plurality of hardware devices each transmitting a unique hardware identifier to one or more mobile devices.

The method may further comprise providing one or more mobile devices with a token to permit access to the application.

The method may further comprise revoking the token, thereby preventing access.

In the method, the data may be sensor data and may be sent from the hardware device.

In the method, the data may be sensor data and may be sent from a plurality of hardware devices.

In the method, the data may be software or firmware updates and may be sent from one or more mobile devices.

In yet another embodiment, a method for protecting wireless access to a hardware device with a hardware device password that is unknown to a user is provided, the method comprising the user connecting to an application on a mobile device, wirelessly receiving, at the mobile device, a unique hardware identifier transmitted from the hardware device, the application matching, at the mobile device, the hardware identifier with the same hardware identifier stored on the mobile device, the application covertly selecting, at the mobile device, the hardware device password based on the hardware device identifier, the application covertly wirelessly transmitting the hardware device password from the mobile device to the hardware device, and authenticating the application on the mobile device at the hardware device upon receipt of the hardware device password.

The method may further comprise the application covertly sending the invisible password and the hardware identifier from the mobile device to a remote storage device.

The method may further comprise the remote storage device covertly sending the invisible password and the hardware identifier to the application on one or more other mobile devices and the one or more mobile devices covertly storing the invisible password and the hardware identifier.

The method may further comprise the one or more other mobile devices receiving the hardware identifier transmitted from the hardware device, the application matching, at the one or more mobile devices, the hardware identifier with the same hardware identifier stored on the mobile device, the application covertly selecting, at the one or more mobile devices, the invisible password based on the hardware device identifier, the application covertly wirelessly transmitting the invisible password from the one or more mobile devices to the hardware device, and authenticating an application on each of the one or more the mobile devices at the hardware device upon receipt of the invisible password.

The method may further comprise a plurality of hardware devices each transmitting a unique hardware identifier to one or more mobile devices.

The method may further comprise providing one or more mobile devices with a token to permit the user to access to the application.

The method may further comprise revoking the token, thereby preventing access by the user.

In yet another embodiment, a method of protecting wireless access between a mobile device and a hardware device with a hardware device password that is hidden from a user and a default password is provided, the method comprising the hardware device transmitting a unique hardware identifier, an application on the mobile device scanning for the hardware identifier, the application connecting to the hardware device using the default password, the application changing the password to a secure password that the user cannot access, storing the secure password on the mobile device, the user initiating authentication to the hardware device, the application covertly sending the secure password to the hardware device and the application covertly sending the secure password and the hardware identifier to a remote storage device.

The method may further comprise the remote storage device transmitting the secure password and the hardware identifier to the application on other approved mobile devices.

In the method the hardware identifier may be a serial number for the hardware.

In yet another embodiment, a computer programme product for facilitating protecting wireless access to a hardware device with a hardware device password that is hidden from a user is provided, the computer programme product comprising a computer readable storage medium having programme instructions therein, the program instructions executable by a processor to cause the processor to perform a method comprising: wirelessly receiving, at a mobile device, a unique hardware identifier transmitted from the hardware device, matching, at the mobile device, the hardware identifier with the same hardware identifier stored on the mobile device, selecting, at the mobile device, an invisible password based on the hardware device identifier, transmitting the invisible password from the mobile device to the hardware device, authenticating an application on the mobile device at the hardware device upon receipt of the invisible password and communicating data between the one or more hardware devices and the mobile device.

FIGURES

FIG. 8 is a schematic of a successful authentication to a known device.

FIG. 9 is a schematic of a failed user authentication.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Hardware devices that that offer device-only passwords need to remain secure through employee turn-over and enable one-click authentication for users. Device passwords are managed by the system, and replicated to other users without end-user visibility. Users can simply press a "Connect" button when physically with the device and the user is authenticated if it's a device for their company/agency.

Figure 1:
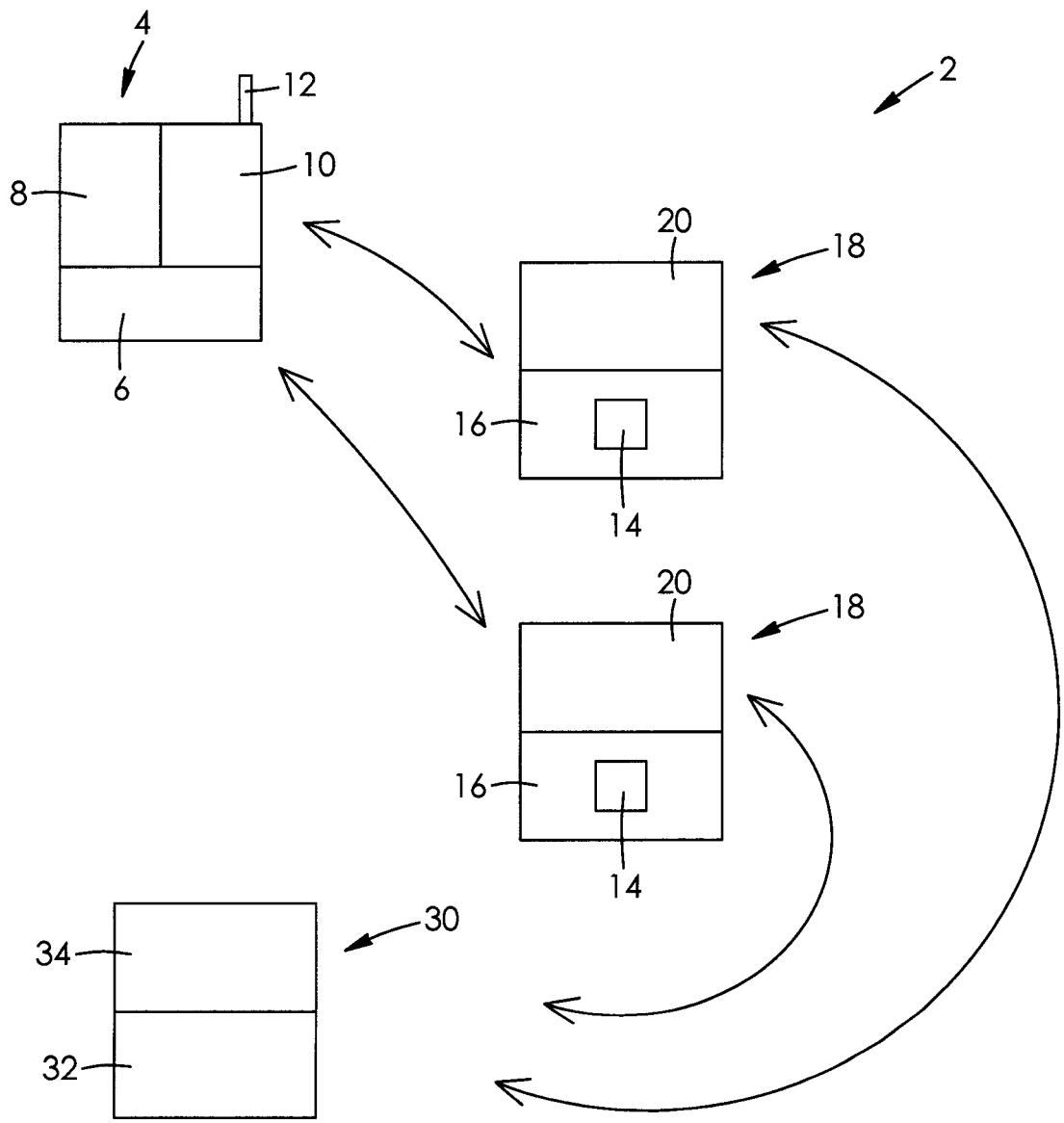
FIG. 1 is a block diagram of the system of the present technology.

As shown in FIG. 1, a system, generally referred to as 2, includes a hardware device, generally referred to as 4, which includes sensors 6, secure data storage 8 (memory) communicatively coupled to a processor 10, and a wireless access point 12. The hardware device 4 has shared access through an application (app) 14 which is stored in the memory 16 of a computing device, generally referred to as 18. The memory 16 may be embodied as any type of volatile or non-volatile memory or data storage capable of performing the functions described herein. In operation, the memory 16 may store various data and software used during operation of the computing device 18 such as operating systems, applications, programs, libraries, and drivers. The memory 16 is communicatively coupled to a processor 20.

There is a plurality of computing devices 18, each with the app 14 (while two are shown in the figure, it is envisioned that there is a multiplicity of computing devices). The apps 14 communicate data to and from a storage device, generally referred to as 30 with a machine-readable storage medium 32 and a processor 34. The storage device 30 is preferably cloud storage, however, it may alternatively be embodied as any storage device, mechanism, or other physical structure for storing or transmitting information in a form readable by a machine (e.g., a volatile or non-volatile memory, a media disc, or other media device).

The computing devices 18 are preferably a mobile computing device. The illustrative mobile computing device may be embodied as any type of computing device capable of performing the functions described herein. For example, the mobile computing device may be embodied as a smartphone, cellular phone, tablet computer, wearable computing device, personal digital assistant, mobile Internet device, laptop computer, notebook, netbook, smart device, and/or any other computing/communication device. Although being described as a mobile device, the mobile computing device may be embodied as a stationary computing device (e.g., a desktop computer) in other embodiments.

Communication of passwords and data is wireless and is preferably Wi-Fi or Bluetooth®. It may also be embodied as any other wired or wireless protocols. The arrows show bidirectional communication.

Figure 2:
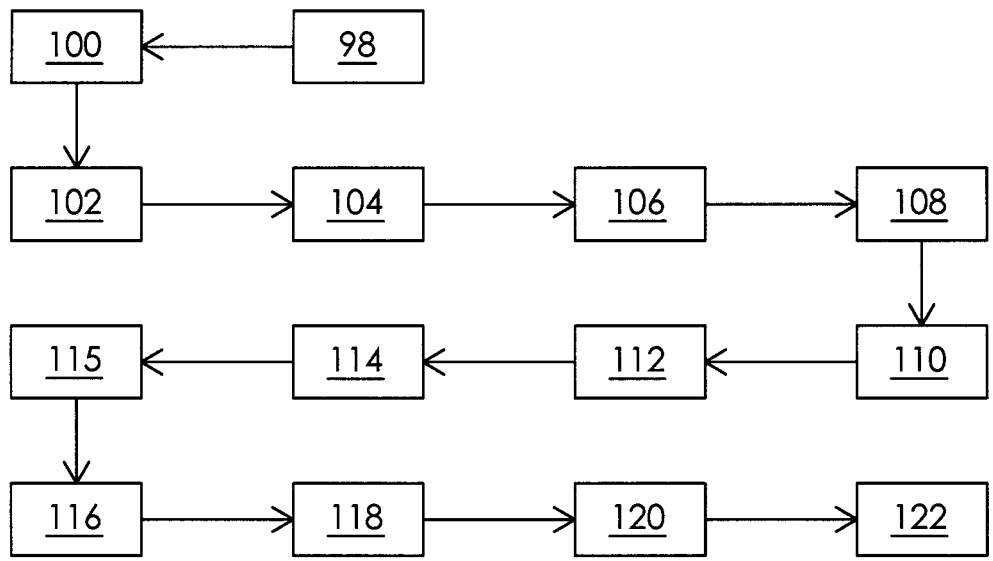
FIG. 2 is a schematic of adding a new hardware device to the system of FIG. 1.

As shown in FIG. 2, when a new hardware device 4 is added 98, the app 14 scans 100 for hardware devices 4 that meet the requirements (a unique identifier such as, but not limited to serial number, Network Media Access Control (MAC) address, Trusted Platform Module (TPM) Chip, Portable Communication Unit (PCU) Identification (ID) and the like) and device type). When one is located, the app 14 displays 102 the option to log on to the device. When the user taps or selects the "Connect" option, the app logs on wirelessly 104 using the default password. The app 14 then generates 106 a new secure password (this is a randomly generated password) and stores 108 it in the memory 16. The user does not see or set the password. The memory also instructs 110 the app 14 to send 112 the password and device serial number wirelessly to the cloud storage 30 where it is stored 114 in the machine-readable storage medium 32 in the cloud storage 30. The serial number and passwords are encrypted 115. The machine-readable storage medium 32 instructs 116 the cloud storage 30 processor 34 to send 118 the password to the app 14 on all the mobile computing devices 18 that are part of its agency. The password remains confidential and hidden from the end users. Any approved mobile computing devices 18 can then access 120 the hardware device's password and the user of the approved mobile computing device 18 can access 122 data and software on the hardware device 4.

Figure 3:
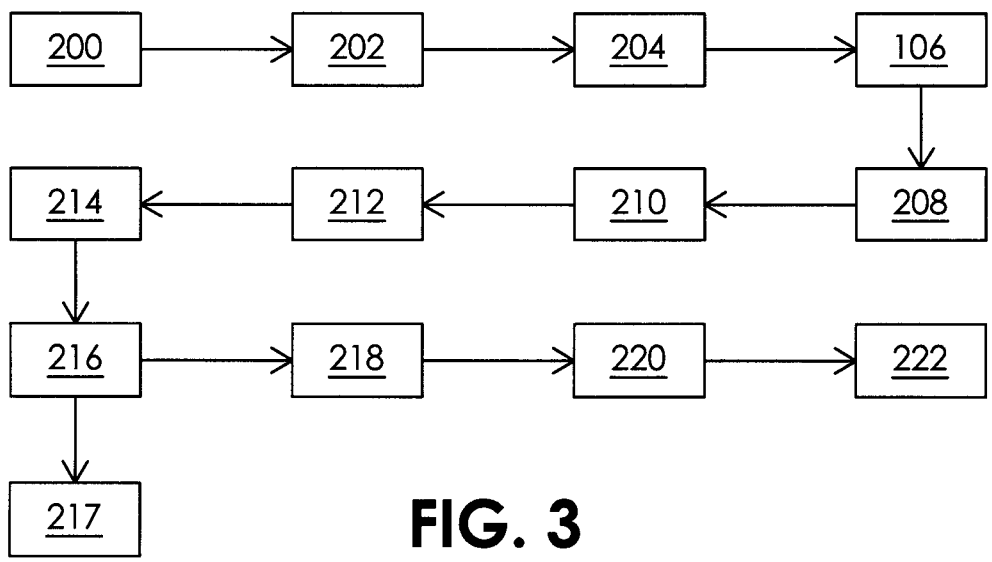
FIG. 3 is a schematic of a user connecting to the device of the system of FIG. 1.

As shown in FIG. 3, a user has 200 a user name and creates 202 a password for the app 14 on their mobile computing device 18. The user then enters 204 their user name and enters 206 their password to obtain 208 a token. This token enables the user to use the app 14, until the token expires. Assuming the token has not expired, the user then opens 210 the app and the interface 60 shown in FIG. 4 appears. The user clicks 212 the connect button 62. The password for the hardware device 4 is read 214 out of the machine readable storage medium 32, passing 216 without detection by the user to the app 14 where it is stored 217, ready for authenticating the user's mobile computing device. The password is invisible to the user. If the user's account is removed 218, the token expires 220 and the user is locked out 222 of all the hardware in the agency.

Figure 4:
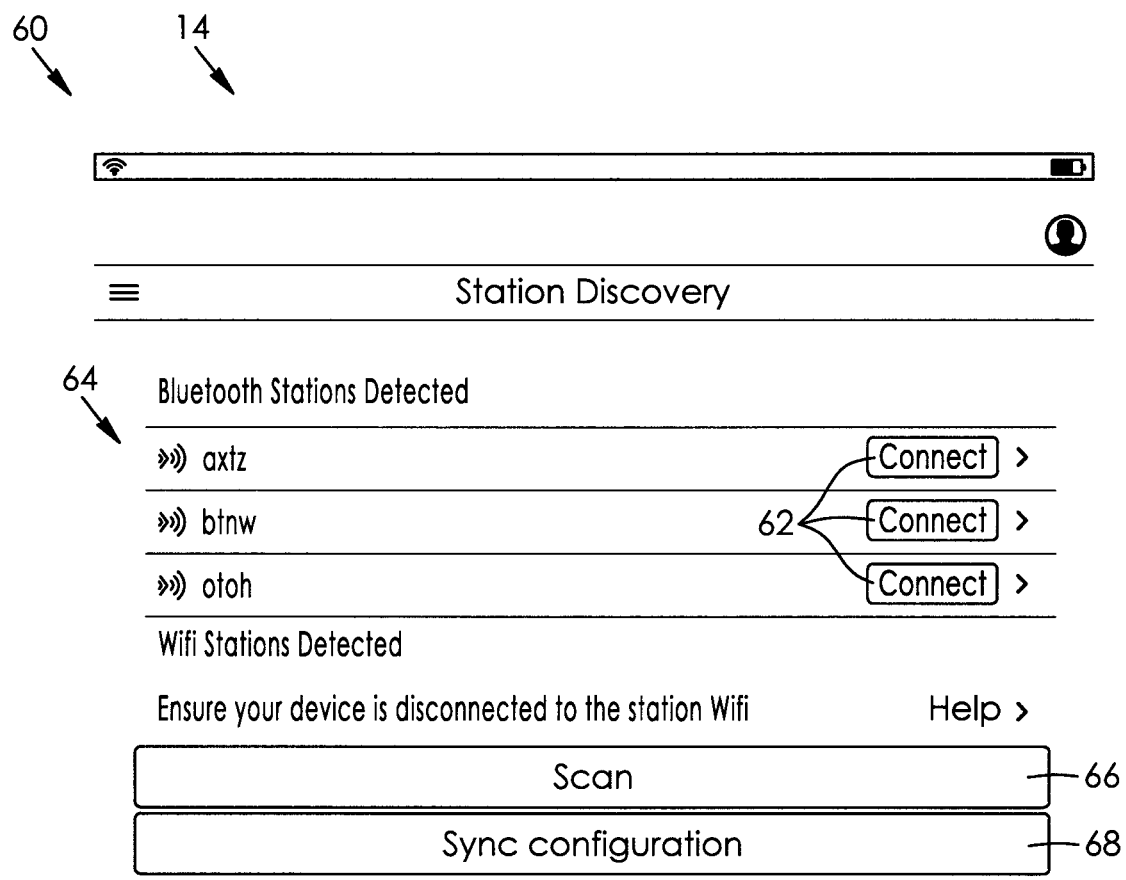
FIG. 4 is a face view of the interface of the present technology.

The interface, shown in FIG. 4, generally referred to as 60, shows a list 64 of the hardware devices 4 that are detected. Each has a one click "Connection" button 62. Clicking the button connects the mobile computing device 18 wirelessly to the hardware device 4. A scan button 66 allows the app to scan for hardware devices 4 and a synchronization (sync) button 68 allows the app 14 to sync with the cloud storage 30.

Figure 5:
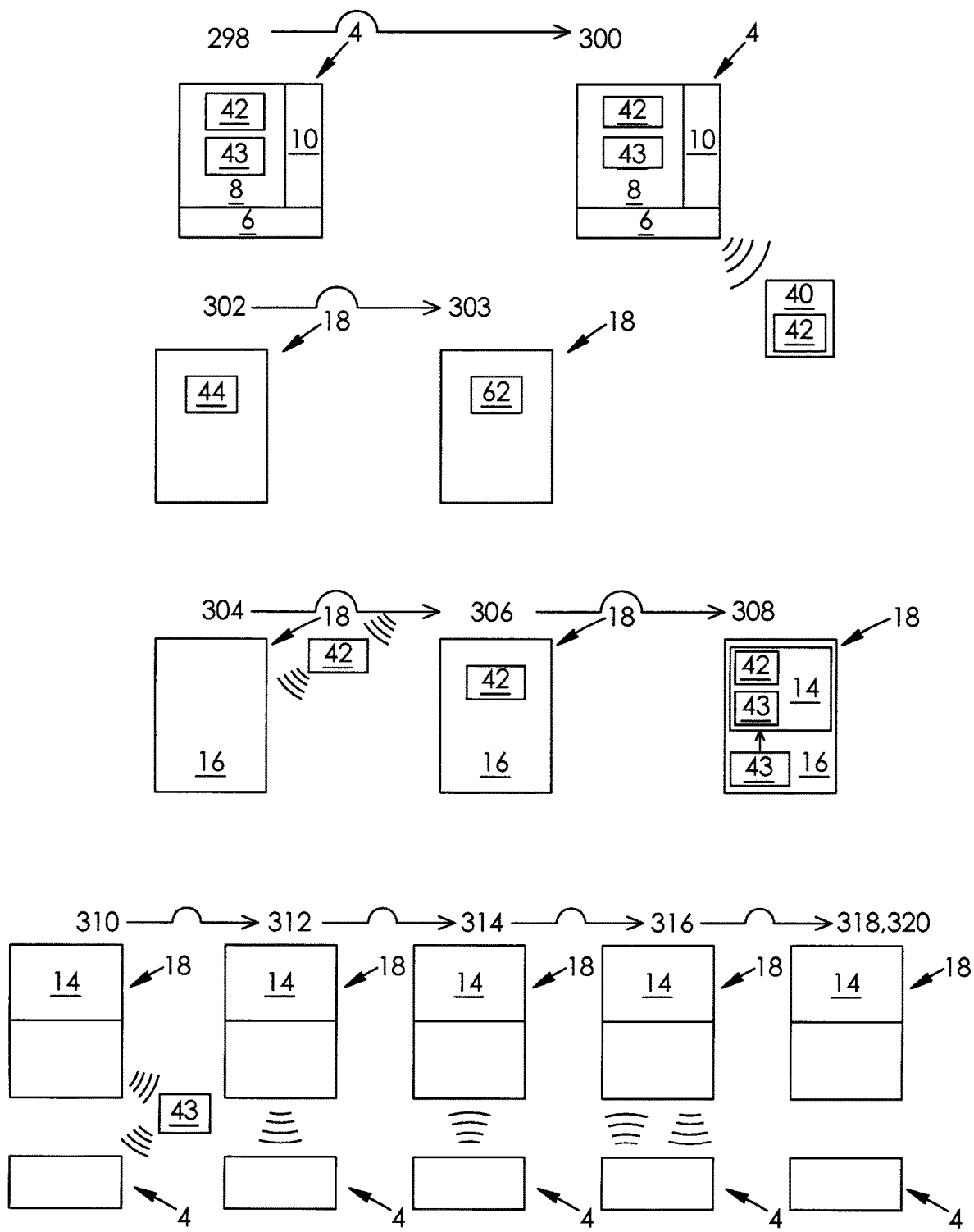
FIG. 5 is a schematic detailing the interaction between components of the system of FIG. 1.

The details of the interaction are shown in FIG. 5. The hardware device 4 stores 298 the serial number 42 and password 43 in the device secure data storage 8. They are encrypted. The hardware device 4 broadcasts 300 its wireless beacon 40, which has the serial number 42 in it. A user obtains 302 a token 44 on their mobile computing device 18. When the user clicks 303 "Connect" 62, the serial number 42 is taken out 304 of the beacon 40 and looked up 306 in the memory 16 on the mobile computing device 18. If there is a match, the password 43 is retrieved and decrypted 308, then supplied 310 to the station (hardware device 4). A request to connect is made 312 and access is granted 314. The hardware device 4 maintains 316 a connection with the app 14 until the app issues 318 a disconnect or the connection is dropped 320.

Figure 6:
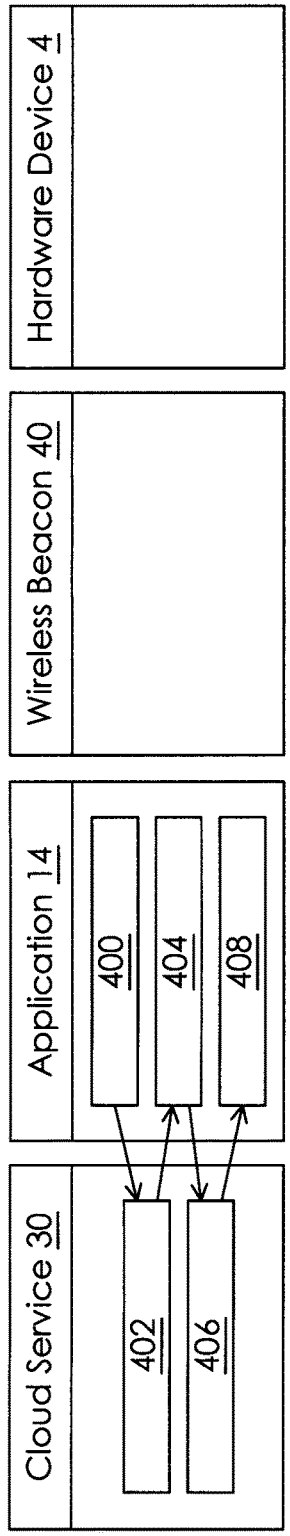
FIG. 6 is a schematic of a successful authentication and password sync.

A schematic of a successful authentication and password sync is shown in FIG. 6. For a successful authentication and password sync, the user provides 400 the password to the app 14, the user is authenticated 402 in the cloud service 30, the hardware device passwords are synced 404 in the app 14 and sent 406 to the cloud service 40, which sends 408 the hardware device passwords back to the app 14 for storage in the memory 16. The user cannot see the passwords.

Figure 7:
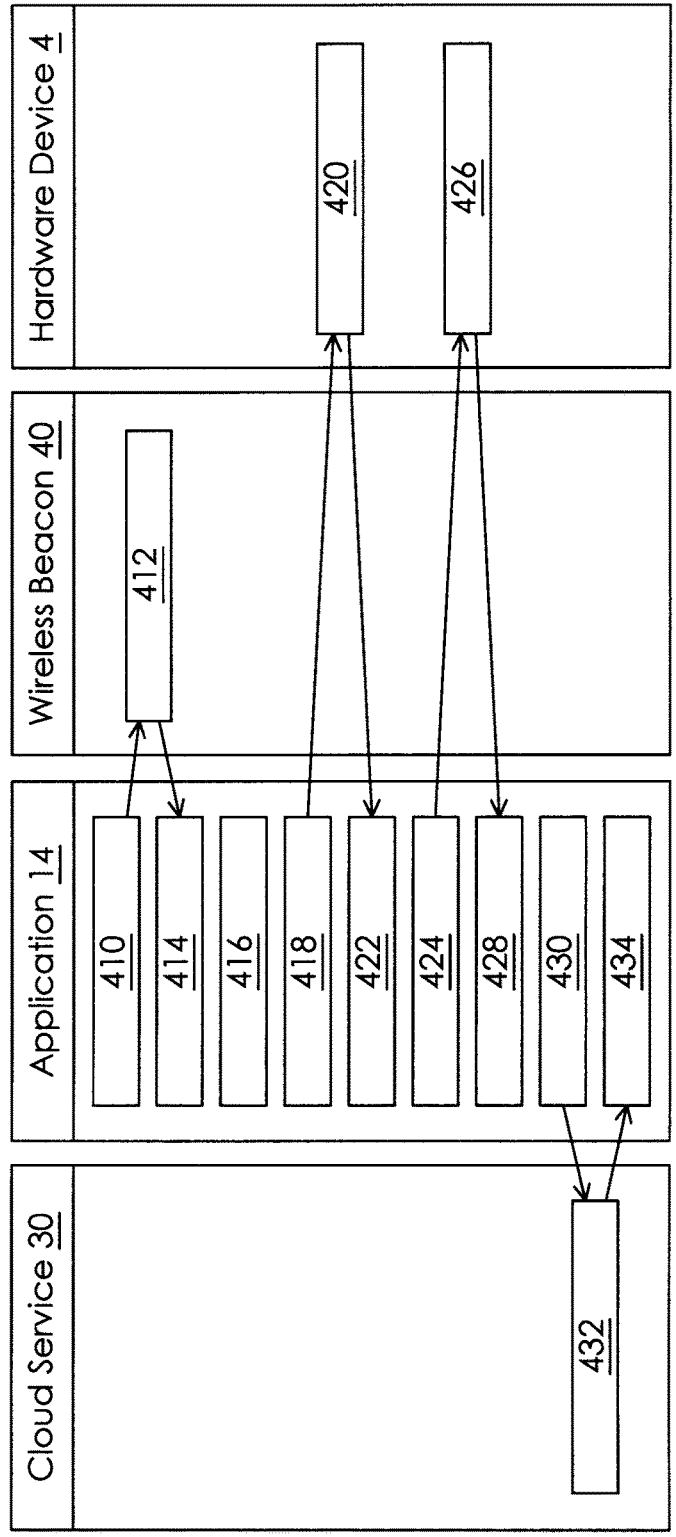
FIG. 7 is a schematic of a successful authentication to a new hardware device with a hardware device password reset.

A schematic of a successful authentication to a new hardware device with a hardware device password reset is shown in FIG. 7. For successful authentication to a new hardware device 4 with a hardware device password reset, the app 14 conducts 410 a hardware device 4 scan, the wireless beacon 40 responds 412 to the scan, the app extracts 414 the serial number from the beacon 40, the app looks 416 for the serial number password, the app tries 418 the default password, the hardware device responds 420 to authentication and the app then connects 422 to the hardware device 4. The app 14 generates 424 a new password, which is sent to the hardware device 4, which changes 426 the password. The app 14 then stores 428 the new password. The hardware device 4 passwords are synced 430, the cloud service 40 saves 432 the hardware device 40 passwords and the app removes 434 the sync queue.

A schematic of a successful authentication to a known device is shown in FIG. 8. For successful authentication to a known hardware device 4, the app 14 scans 436 for the hardware device 4, the wireless beacon 40 responds 438 to the scan, the app 14 extracts 440 the serial number from the beacon 40. The app 14 then looks 442 for the serial number password. The app 14 tries 444 the known password, the hardware device 4 responds 446 to the authentication and the app 14 connects to the hardware device 4.

A schematic of a failed user authentication is shown in FIG. 9. The user provides 500 the password to the app 14, the cloud service 30 fails 502 to authenticate the user and the app 14 is denied 504 access.

Figure 10:
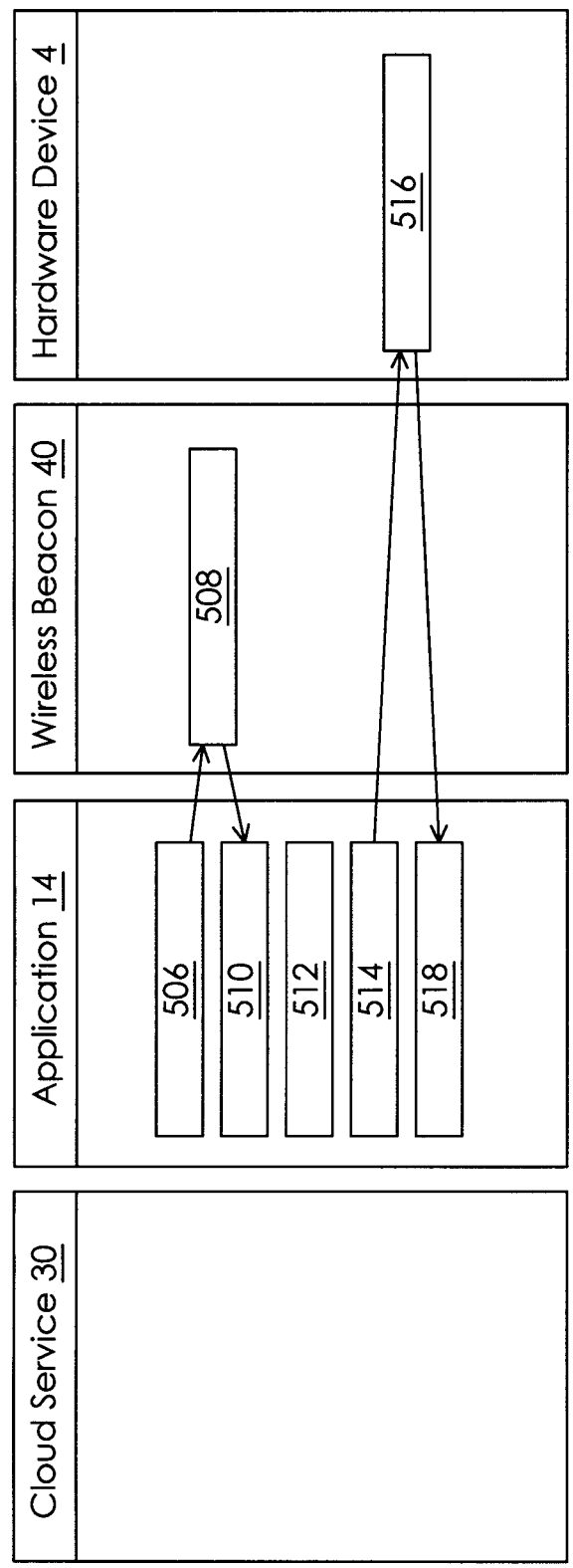
FIG. 10 is a schematic of a failed authentication to an unknown device.

A schematic of a failed authentication to an unknown device is shown in FIG. 10. The app 14 scans 506 for the hardware device 4, the wireless beacon 40 responds 508 to the scan, the app 14 extracts 510 the serial number from the beacon 40, the app 14 looks 512 for the serial number password and doesn't have a password, and then tries 514 the default password. The hardware device 4 fails 516 to recognize the password and the app 14 is denied 518 access.

Example 1

A technician is requested to download environmental monitoring data from a hardware device. The hardware device includes at least one environmental sensor and stores the data from the sensor to its memory. In the past, the technician would have to travel to the location of the hardware device, which may be a remote location, physically unlock the hardware device and remove or copy the data. Now, the technician logs in to their mobile device using their own user name and password. The mobile device includes an app for connecting to the remote hardware device. The user gains access to the app as they have been provided with a token that is valid. A password for the hardware device has previously been sent to the mobile device from the cloud storage (the cloud storage stores both the hardware device password and serial number). The technician has no access to the password. It is hidden from this technician and all other users. The remote hardware device wirelessly transmits a device identifier, which in this case is the remote hardware device serial number. The app is scanning for the device identifier, and when it locates it, the device identifier is extracted from the hardware device beacon and matched to the device identifier on the app. The app can now look for the hardware device password corresponding to the serial number and send it to the hardware device. The authentication is successful and the technician can wirelessly access the data.

Example 2

A technician is requested to update firmware on a hardware device. The hardware device includes at least one environmental sensor under control of the firmware, and memory. In the past, the technician would have to travel to the location of the hardware device, which may be a remote location, physically unlock the hardware device and update the firmware. Now, the technician logs in to their mobile device using their own user name and password. The mobile device includes an app for connecting to the remote hardware device. The user gains access to the app as they have been provided with a token that is valid. A password for the hardware device has previously been sent to the mobile device from the cloud storage (the cloud storage stores both the hardware device password and serial number). The technician cannot access to the password. It is concealed from this technician and all other users. The remote hardware device wirelessly transmits a unique device identifier, which in this case is the remote hardware device serial number. The app is scanning for the device identifier, and when it locates it, the device identifier is extracted from the hardware device beacon and matched to the device identifier on the app. The app can now look for the hardware device password corresponding to the serial number and send it to the hardware device. The authentication is successful and the technician can wirelessly update the firmware. Similarly, software on the hardware device can be updated, removed or added using the same system and method, again, with the hardware device password remaining completely obscured from the technician or any other user.

Example 3

An administrator is requested to change the device's password. The hardware device includes at least one environmental sensor and stores the data from the sensor to its memory. The administrator logs in to their mobile device using their own user name and password. The mobile device includes an app for connecting to the remote hardware device. The administrator has access to the app. The administrator initiates a password change with the app. The new password is randomly generated and invisible to the administrator. The app then generates a new secure password (this is a randomly generated password) and stores it in the memory. The administrator does not see or set the password. The memory also instructs the app to send the password wirelessly to the cloud storage where it is stored in the machine-readable storage medium in the cloud storage. The serial number is associated with the password and both are encrypted. The new password is disseminated to the device and all authorized mobile clients when they re-synchronize. The password remains confidential and hidden from the end users.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A computer system for protecting access to one or more shared hardware devices using multi-level authentication with a hardware device password that is invisible to a user, the system comprising a mobile device, additional mobile devices, a cloud computing storage and the shared hardware device, the mobile device including: a memory, the memory storing one or more invisible passwords; an application in the memory; a wireless interface for communicating with the shared hardware device; and a processor coupled to the memory, the application and the wireless interface, the additional mobile devices each including a memory; an application in the memory, wherein the application is the same application as on the mobile device; a wireless interface for communicating with the shared hardware device and the cloud computing storage; and a processor coupled to the wireless interface and the memory, wherein the cloud computing storage is for storing the one or more invisible passwords and the hardware device identifier and is configured to provide the invisible password to the mobile devices, the shared hardware device including: a memory; a wireless interface for communicating with the mobile devices; and a processor coupled to the memory and the wireless interface; wherein the processor in the mobile devices are configured to receive a unique hardware device identifier from the processor in the shared hardware device; wherein the application in the mobile devices is configured to select, based upon the unique hardware device identifier, the invisible password for the shared hardware device; and the processor in the shared hardware device is configured to authenticate the application upon receipt of the invisible password, thereby protecting access using multi-level authentication.

2. A method for protecting wireless access to a shared hardware device using multi-level authentication, with a hardware device password that is invisible to a user, the method comprising wirelessly receiving, at a mobile device, a unique hardware identifier transmitted from a shared hardware device, matching, at the mobile device, the hardware identifier with the same hardware identifier stored on the mobile device, selecting, at the mobile device, an invisible password based on the hardware device identifier, wirelessly transmitting the invisible password from the mobile device to the shared hardware device, authenticating an application on the mobile device at the shared hardware device upon the shared hardware device receiving receipt of the invisible password, wirelessly sending the invisible password and the hardware identifier from the mobile device to a remote storage device, the remote storage device wirelessly sending the invisible password and the hardware identifier to one or more other mobile devices, the one or more mobile devices storing the invisible password and the hardware identifier, the one or more other mobile devices receiving the hardware identifier transmitted from the shared hardware device, matching, at the one or more mobile devices, the hardware identifier with the same hardware identifier stored on the mobile device, selecting, at the one or more mobile devices, the invisible password based on the hardware device identifier, wirelessly transmitting the invisible password from the one or more mobile devices to the shared hardware device, and authenticating an application, which is the same application as on the mobile device, on each of the one or more the mobile devices at the shared hardware device upon receipt of the invisible password.

3. The method of claim 2, further comprising a plurality of shared hardware devices each transmitting a unique hardware identifier to the mobile device and the one or more mobile devices.

4. The method of claim 3, further comprising providing the mobile device and the one or more mobile devices with a token to permit access to the application.

5. The method of claim 4, further comprising revoking the token, thereby preventing access.

6. A method for communicating data between a hardware device and a mobile device, the method comprising wirelessly receiving, at a mobile device, a unique hardware identifier transmitted from a hardware device, matching, at the mobile device, the hardware identifier with the same hardware identifier stored on the mobile device, selecting, at the mobile device, an invisible password based on the hardware device identifier, transmitting the invisible password from the mobile device to the hardware device, authenticating an application on the mobile device at the hardware device upon the shared hardware device receiving receipt of the invisible password, communicating data between the one or more hardware devices and the mobile device, wirelessly sending the invisible password and the hardware identifier from the mobile device to a remote storage device, the remote storage device wirelessly sending the invisible password and the hardware identifier to one or more other mobile devices, the one or more mobile devices storing the invisible password and the hardware identifier, the one or more other mobile devices receiving the hardware identifier transmitted from the hardware device, matching, at the one or more mobile devices, the hardware identifier with the same hardware identifier stored on the mobile device, selecting, at the one or more mobile devices, the invisible password based on the hardware device identifier, wirelessly transmitting the invisible password from the one or more mobile devices to the hardware device, and authenticating an application, which is the same application as on each of the one or more the mobile devices, at the hardware device upon receipt of the invisible password.

7. The method of claim 6, further comprising a plurality of hardware devices each transmitting a unique hardware identifier to the mobile device and the one or more mobile devices.

8. The method of 7, further comprising providing the mobile device and the one or more mobile devices with a token to permit access to the application.

9. The method of claim 8, further comprising revoking the token, thereby preventing access.

10. The method of claim 6, wherein the data are sensor data and are sent from the hardware device.

11. The method of claim 7, wherein the data are sensor data and are sent from a plurality of hardware devices.

12. The method of claim 11, wherein the data are software or firmware updates and are sent from one or more mobile devices.

\* \* \* \* \*